United States Patent [19]
Sterner

[11] 3,742,309
[45] June 26, 1973

[54] MOUNTING CLAMPS SUPPORTING STACKED PRINTED CIRCUIT BOARDS

[75] Inventor: Eric Sterner, Hagersten, Sweden

[73] Assignee: Telefonaktiebolaget L M Ericsson, Stockholm, Sweden

[22] Filed: Aug. 25, 1971

[21] Appl. No.: 174,800

[30] Foreign Application Priority Data

Sept. 4, 1970 Sweden ............................ 12030/70

[52] U.S. Cl... 317/101 D, 317/101 CW, 174/158 R, 24/73 P

[51] Int. Cl. ............................................ H05k 1/14

[58] Field of Search .................... 174/138 D, 158 R; 24/73 P, 73 AP, 73 PF; 317/101 R, 101 D, 101 DH, 101 CW

[56] References Cited

UNITED STATES PATENTS

| | | | |
|---|---|---|---|
| 3,568,001 | 3/1971 | Straus | 317/101 D |
| 3,066,367 | 12/1962 | Garman | 174/158 R |
| 3,274,450 | 9/1966 | Siebold | 174/158 R |
| 3,357,292 | 12/1967 | Falkenberg | 24/73 PF |

FOREIGN PATENTS OR APPLICATIONS

| | | | |
|---|---|---|---|
| 938,327 | 10/1963 | Great Britain | 317/101 DH |

*Primary Examiner*—Robert K. Schaefer
*Assistant Examiner*—Gerald P. Tolin
*Attorney*—Frederick E. Hane, Charles E. Boxley et al.

[57] ABSTRACT

In an arrangement for assembling printed circuit cards with electronic components in mutually parallel positions each card is provided with two elements fixed along an edge of the cards. One of the elements is clamp formed and the other one consists of a spring clip, the central part of the clamp formed element is arranged to engage the spring clip element, whereby each card in a stack of cards can be displaced relatively to the other cards in the stack.

1 Claim, 2 Drawing Figures

PATENTED JUN 26 1973

3,742,309

INVENTOR
ERIC STERNER
BY Hane, Baxley and Spiecens
ATTORNEYS

MOUNTING CLAMPS SUPPORTING STACKED PRINTED CIRCUIT BOARDS

The present invention relates to an arrangement for jointing printed circuit cards in which electronic components are mounted. More exactly the invention will make a joint of such cards possible by fitting a card whose one edge is provided with contact pins into a slot. Both card and card slot are of conventional type. With an arrangement according to the invention the cards can be stacked with their flat sides facing each other. Each card is thereby displacably joined to the adjacent card in the pile or stack and can be freed from the card jack or slot with a simple manipulation without the other cards being moved.

The problem which is the basis for the present invention is that the number of inlets and outlets (the number of contact pins) on the one edge of a printed circuit card is frequently insufficient to connect the components which are mounted in the card with the components on another circuit card. It would therefore be suitable to carry out junctions between two adjacent cards in addition to those already existing by means of the contact pins and the card slot.

In practice it is not possible to carry out such internal junctions, because in such a case there should be the risk of these junctions being damaged if one or several cards for some reason must be removed due to the fact that there is no mechanical support between the cards. By means of the arrangement according to the invention an internal junction is made possible, without the risk for this being damaged, when one or several cards are unplugged.

Figure 1:
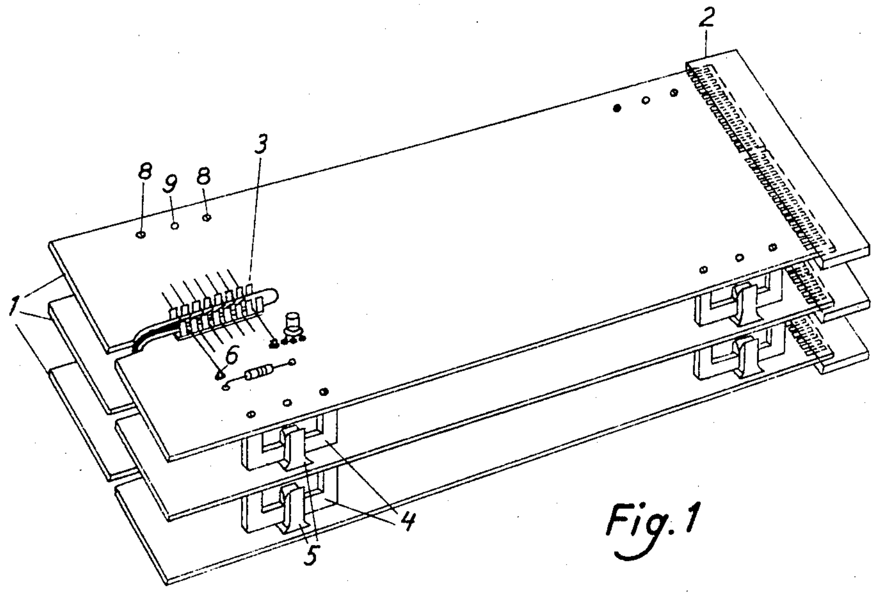

The invention, the characterizing part of which appears from the following claims will be described more in detail with reference to the accompanying drawing where FIG. 1 shows a number of cards stacked upon each other and where these are movable connected to each other by means of the arrangement according to the invention.

FIG. 2A, 2B show in perspective the two elements in a junction medium, by means of which such a stacking of the cards as shown in FIG. 1, is made possible.

In FIG. 1 there is shown a stack of a number of cards 1. At the one edge of each card a number of pins are arranged in a known manner which are provided to be pushed into a card jack or slot 2. In the opposite side of each card a number of thread guides of insulating material are arranged. In each card three holes 8, 9, 8 are bored in each location of the card where junction medium 4, 5 is provided to be applied. It should be applied close to the corner.

Figure 2:
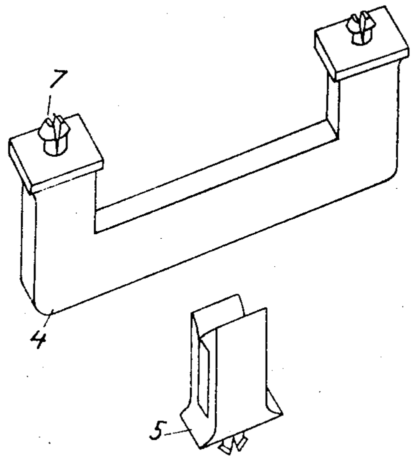

FIG. 2 shows the junction medium in larger scale. The one part 4 of the junction medium is clamp formed with rectangular cross-section. In the end parts of the branches elastically springing stop mediums 7 are arranged to interface with the holes 8 in a card. The other part 5 of the junction medium consists of a spring clip which at its lower part is provided with an elastically springing stop medium, arranged to interface with the holes 9 in a card. The spring clip is arranged to grasp elastically around the central part of the clamp so that the clamp is fixed, but can be displaced in the longitudinal direction of the central part. If thus a circuit card is provided in its one side with parts 4 and another circuit card in its one side with parts 5. These cards can partly be put together by compression and connection between the parts 4 and 5 and partly make possible a displacement in the parallel direction between two adjacent circuit cards until the spring clip abuts against the one branch of the clamp. In this manner an arbitrary number of circuit cards can be assembled and making it possible to have a thread or soft foil junction between components in adjacently situated circuit cards without the risk of being damaged at a displacement of a card. The length of the central part should be chosen equal to the double penetration length of the card slot 2 added to the dimension of the spring clip in the longitudinal direction. In this connection a card can be taken out from the card slot 2 without the nearest card lying over and under being moved. If, for example, the intermediate card in FIG. 1 is drawn out, the left half of the central part is being utilized and if the card lying on top in FIG. 1 is drawn out, the right half of the same central part is being utilized.

The internal junction between two cards is, according to FIG. 1, carried out in such a way that a lead is fixed at a connection 6 in the component on the one card. After that the lead is drawn via a lead conductor 3 where it meets the leads from other connections on the card. The leads are assembled in a cable stem which is put down on the under side of the card, where they, via new lead conductors, are shared to their respective connection points in the underlying card. The cable stem is arranged in a loop so that the moving of the cards is not restrained. In similar manner the internal junctions are carried out between the other cards. In this connection interferences on the interference sensible connection are easier avoided. In earlier known mounting methods it was necessary to draw the junction via the contact pins at the short end and the card slot with its cable stem. The internal junction can also be executed by means of a soft metal foil which reaches from the one card to the other.

We claim:

1. An electrical circuit assembly comprising: a stack of printed circuit cards, each of said cards being provided with holes along two parallelly opposite sides and having electrical contact means along one edge; a number of fixedly mounted card jacks slidingly engaging said contact means of said cards; and card interengaging means including at least two junction mediums, each comprising at least a first and a second element, said first element having the shape of a U with a central part and two branches, said central part having a uniform cross-sectional area along its length and each of said branches an upper surface; a first resilient means attached to the upper surface of each of said branches fixing the same in one of the holes along side of a card by a snapping function, said second element comprising a spring clip having an aperture whose area has the same shape as that of said central part of the first element; a second resilient means attached to said second element fixing the same into a hole of an adjacent card in said stack of cards, the cross-sectional area of the central part of said first element being slightly less than the area of the aperture formed by the spring clip of said second element whereby said first element engages said second element on the adjacent card so that each card can be displaced in a parallel direction relative to the other cards in the stack.

* * * * *